March 31, 1931.  E. H. HAYDEN  1,798,417

CARD FINDING DEVICE

Filed March 28, 1927   2 Sheets-Sheet 1

INVENTOR.
ERMA HUFF HAYDEN
BY
A. B. Bowman
ATTORNEY

March 31, 1931. E. H. HAYDEN 1,798,417
CARD FINDING DEVICE
Filed March 28, 1927 2 Sheets-Sheet 2

INVENTOR.
ERMA HUFF HAYDEN
BY A. B. Bowman
ATTORNEY

Patented Mar. 31, 1931

1,798,417

UNITED STATES PATENT OFFICE

ERMA HUFF HAYDEN, OF SAN DIEGO, CALIFORNIA

CARD-FINDING DEVICE

Application filed March 28, 1927. Serial No. 179,073.

The invention relates to improvements in card-finding devices in which rods operate in conjunction with cards and container; and the objects of the invention are, first, to be able to find instantly and accurately all cards having the information sought, no matter whether the data desired are a single item of information or as many items as can be listed on a single card, thus eliminating the loss of time and tedious process of thumbing thru cards as is required by old systems; second, to eliminate cross-indexing by recording all information regarding each individual on a single card, yet completely classifying said individual; third, to obtain positive visibility of cards bearing information sought, by causing them to move sidewise instantly and automatically while in container and being able to retain them in this visible position as long as it is desired; fourth, to bring cards bearing information sought into further visibility, revealing name and any special information that may be printed at extreme left side of card; fifth, to move used cards out of the way after data have been taken from them, yet retaining them in their regular order and distinct from the main body of cards and having them available for rechecking without another operation; sixth, to be able to bring out additional groups of cards from the main body of cards without disturbing group or groups previously brought out, yet keeping each group distinctly separated from other groups and from main body of cards; seventh, to be able to file cards alphabetically or in any manner desired and still retain the multiple finding feature; eighth, to be able to have complete freedom of cards, so that they may be readily removed from container either individually or in any grouping desired, and yet not disturb the remaining cards; and, ninth, to eliminate eyestrain that resulted from old methods, where it was necessary to inspect each individual card for data required.

Figures 1, 2, 3:
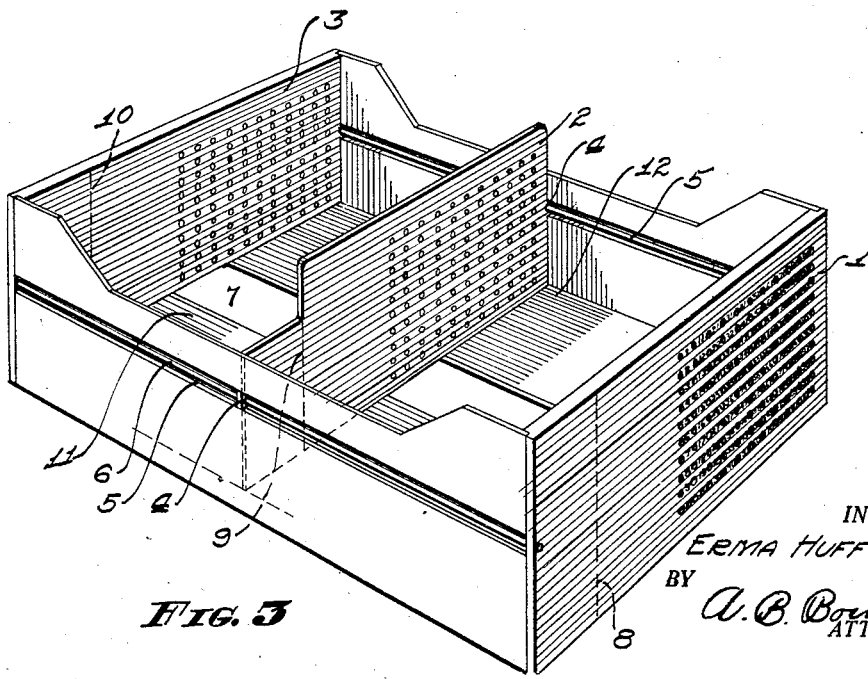
Figure 4:

One form of the invention is illustrated in the accompanying drawings, in which Figure 1 is a plan view of a card, as punched and printed for one form of installation; Fig. 2, a plan view of card, Fig. 1, with data recorded and ready for filing; Fig. 3, a detailed view in perspective of the card container; Fig. 4, a view of a finder rod; and, Fig. 5, a view in perspective of a single cabinet.

It will be noted that the holes in the members 1, 2 and 3 and in the cards are so positioned as to receive the rod for selecting the proper card.

Horizontal spaces between holes are numbered. Each item of data to be recorded is given a number and the name of the item is printed above its number. The unused spaces may be assigned items and names at any time they are needed to list additional information.

On the card, Fig. 2, which has been assigned to an individual, data required are recorded by perforating card horizontally by cutting out numbered spaces between holes. Personal data regarding individual may, if desired, be also entered on face of card.

Specially constructed card container, Fig. 4, is in the form of a tray with open top and has holes in ends 1 and 3 and supporting block 2, to correspond with card, Fig. 1. On the outside of the front of container the spaces between holes are numbered to correspond to those on card, Fig. 1. The supporting block 2, has lugs at each end 4 4. The sides of the container has slots 5 5, and rods 6 6, pass from ends 1 and 3 thru lugs 4 4, which fit in slots 5 5, allowing supporting block 2, to be moved forward to hold cards firmly in place while rodding for data and moved backwards so cards may be moved freely in container. Space 7, is left in the bottom of the container between bottom sections 11 and 12, so that when container is turned on its side and supporting block is moved back the cards may be thoroughly shaken. The container is made wider than the cards to be used, the extra width in container in all cases being such that if cards are placed against both sides of the container at the same time and cards lapped over each other, certain of the holes in the cards would be directly in line with each other. Distance from dotted lines 8, 9 and 10 to right side of container represents cards in rodding position; from dotted lines 8, 9 and 10 to left side of container represents this extra width, which is determined by the amount of visibility desired for cards after rodding.

Figure 5:
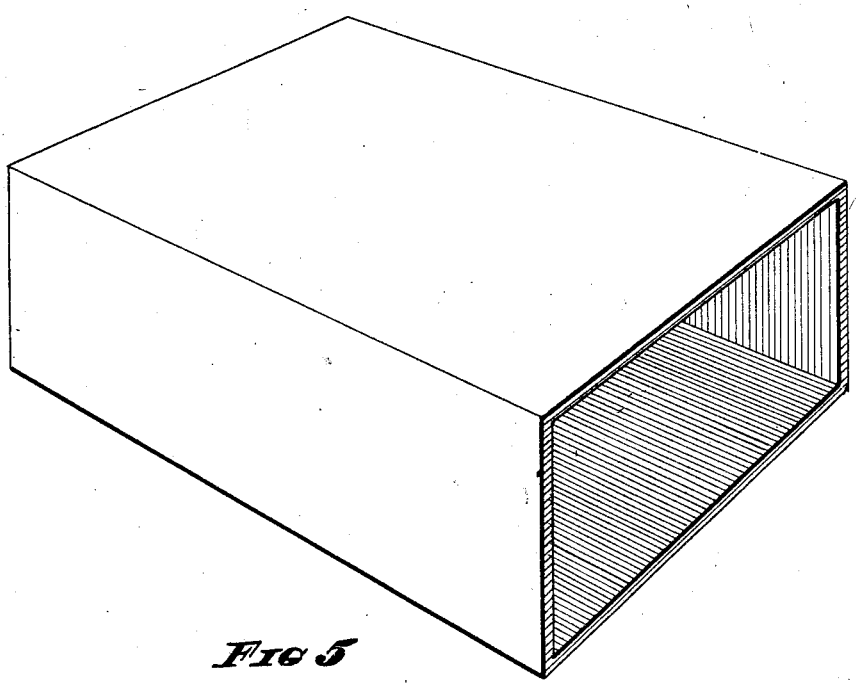

To illustrate the operation of the device, first, place cards, Fig. 2, in file container, Fig. 3, bringing them compactly against front and right side of container and holding them firmly in place by means of the supporting block 2, Fig. 3; second, insert finder rod, Fig. 5, in hole to the left of numbered space corresponding to information desired (continue inserting finders until all items desired in this particular instance are rodded); third, turn container up on its left side, loosen cards by moving supporting block back until cards hang perfectly free on finder rods, shake cards vigorously thus permitting those cards that are perforated at all spaces to the right of holes where finders are inserted to drop the distance of the perforation. The cards thus dropping will stand out to the left from the main body of cards the distance of a perforation and will be those cards having the data sought and all other cards will be held by the finders in their original position. After selected cards have dropped the distance of the perforation, two finder rods may be inserted in extreme right row of holes, holding the main body of cards firm, then by removing original finder rods the selected cards will drop the full distance to left side of container. Return container to natural position and it will be found that selected cards stand out in greater visibility than in any other known card-filing device, and any special data written in the reserved space that may be left on left side of card will be ready for instant reference without removing card from container.

In using cards after a selection has been made, each card, as informaiton is taken from it, may be moved to the right against rods holding main body of cards, thus being out of the way of cards yet to be inspected and yet will stand out the distance of a perforation from the main body of cards and be ready for rechecking or a second inspection if desired.

After making first selection and cards have dropped to extreme left side of container, another selection may be made by inserting finder rods for new selection and removing finder rods on extreme right holding main body of cards, container is again turned on left side, allowing second selection to drop the distance of the perforation as is the case with first simple selection. The rods holding main body of cards may again be inserted at extreme right and it will be found that each selection is distinctly separate and selected cards cannot mix, neither can they become confused with main body of cards.

When selection has been made and it is desired to return cards to rodding position, all rods are removed and by turning container on right side and shaking same, cards will be returned to original position. Any cards that have been removed may be filed in usual manner.

When not in use, container, Fig. 3, may be placed in the file cabinet, Fig. 5.

I am aware that prior to my invention card finding devices have been made with rods operating in conjunction with container. I therefore do not claim such a combination broadly; but

I claim:

1. A card-finding device having a container wider than the file cards and with holes in vertical and horizontal rows in front and a follower block with similarly arranged holes to correspond with the holes in the file cards filed therein.

2. A card-finding device having a container wider than the file cards and with holes in vertical and horizontal rows in front and back of the same and a follower block with similarly arranged holes to correspond with the holes in file cards filed therein.

ERMA HUFF HAYDEN.